Jan. 6, 1942.                A. G. WHITEHEAD                2,269,390
                           CROSS SLIDE FOR LATHES
                            Filed Aug. 6, 1940              2 Sheets-Sheet 1
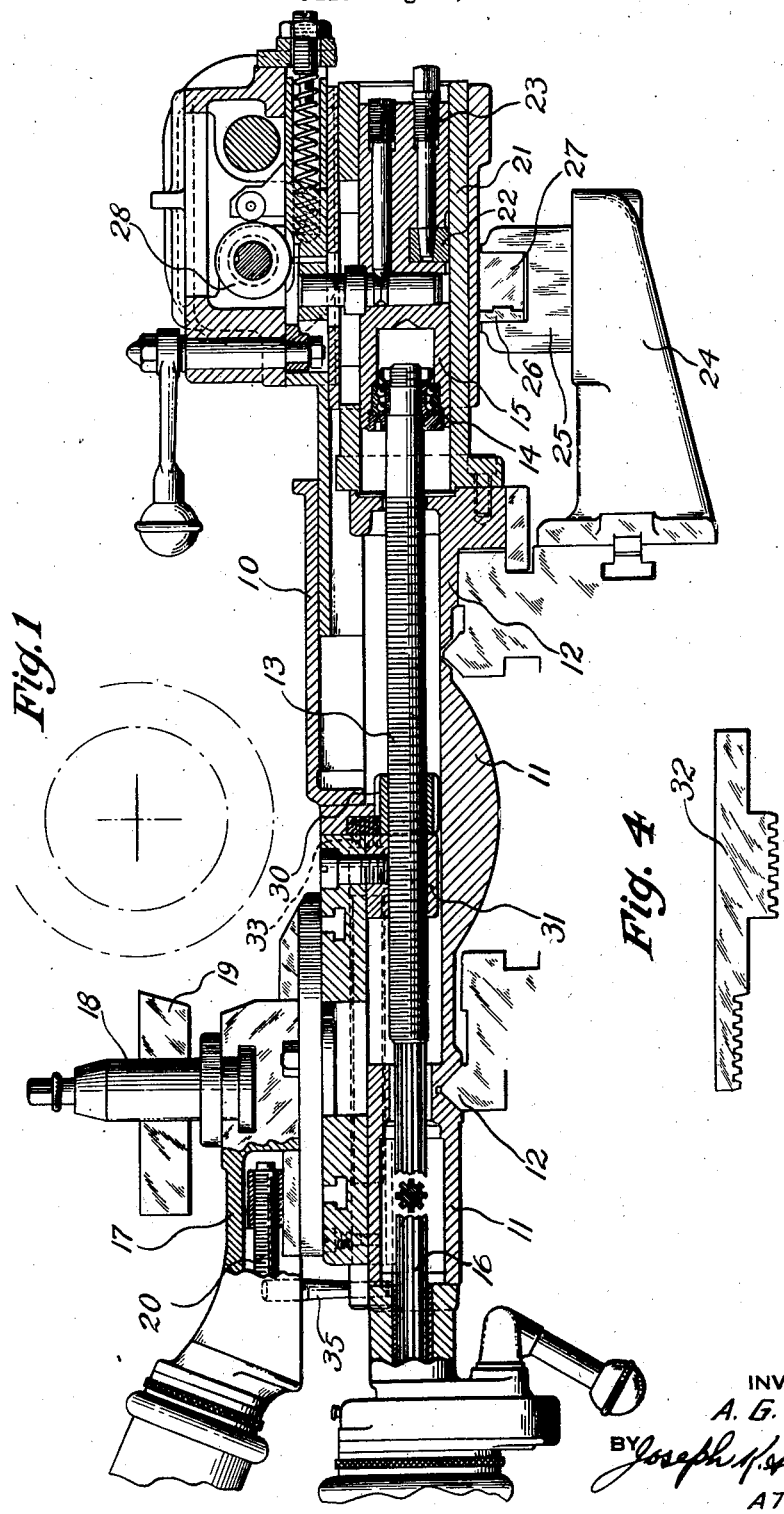
INVENTOR
A. G. Whitehead
BY Joseph J. Schofield
ATTORNEY Jan. 6, 1942.    A. G. WHITEHEAD    2,269,390
CROSS SLIDE FOR LATHES
Filed Aug. 6, 1940    2 Sheets-Sheet 2
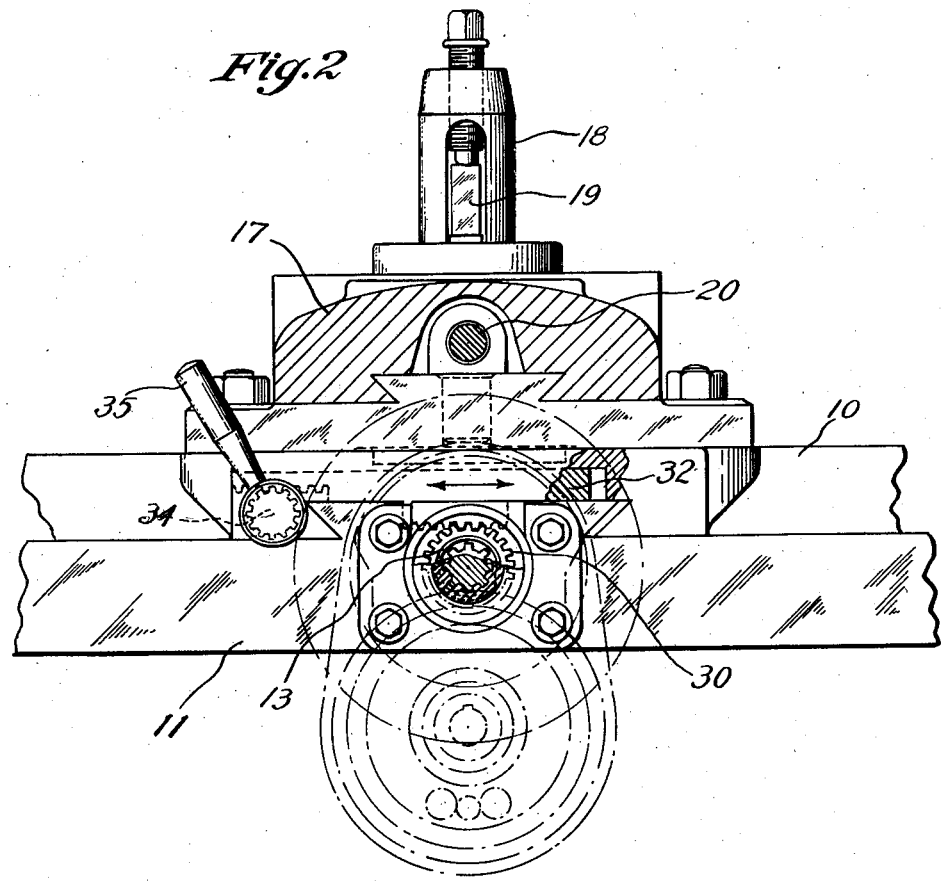
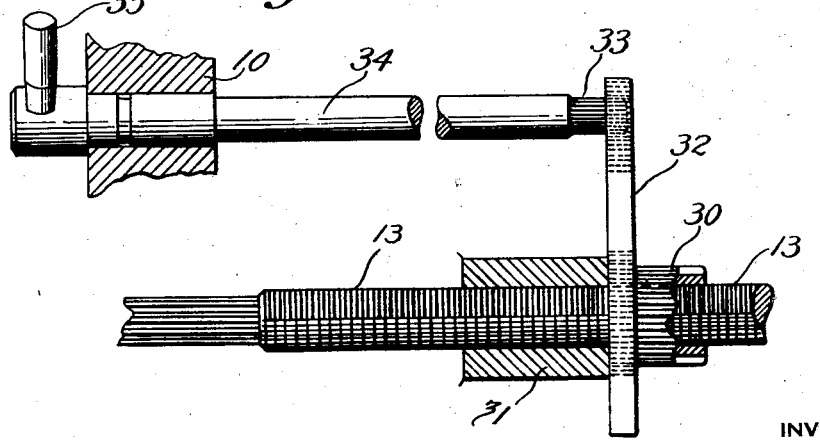
INVENTOR
A. G. Whitehead
BY Joseph K. Schofield Patented Jan. 6, 1942

2,269,390

UNITED STATES PATENT OFFICE 2,269,390

CROSS SLIDE FOR LATHES

Alexander G. Whitehead, East Hartford, Conn., assignor to Niles-Bement-Pond Company, West Hartford, Conn., a corporation of New Jersey Application August 6, 1940, Serial No. 351,613

6 Claims. (Cl. 82—17)

This invention relates to lathes and particularly to an improved operating mechanism for lathe cross slides adapted for taper turning and relieving operations.

A primary object of the invention is to provide a lock nut on the cross slide adjusting screw that will enable the cross slide to be locked in position relative to the screw at any point along this screw.

Another object of the invention is to provide means for locking a nut upon a cross slide screw, the operating means for which may be conveniently operated by a lever at the front of the cross slide.

One feature that enables me to accomplish the above-named objects is that the outside circumferential surface of the locking nut is provided with gear teeth meshing with rack teeth on the lower surface of a member supported within the cross slide and movable at right angles to the direction of the cross slide adjusting screw, the means for moving this member comprising gear connections between the member and a forwardly extending rod on which at its forward end may be mounted a hand lever.

With the above and other objects in view, the invention may include the features of construction and operation set forth in the following specification and illustrated in the accompanying drawings.

In the accompanying drawings annexed hereto and forming a part of this specification, I have shown the invention embodied in a relieving and taper turning lathe of standard form, but it will be understood that the invention can be otherwise embodied and that the drawings are not to be construed as defining or limiting the scope of the invention, the claims appended to this specification being relied upon for that purpose.

In the drawings:

Figure 1 is a sectional view in elevation of a cross slide showing the present invention applied thereto.

Fig. 2 is a front elevation of the parts shown in Fig. 1, partly broken away to more clearly show their construction.

Fig. 3 is a diagrammatic view in plan showing the means for rotating the supplemental nut on the cross slide adjusting screw into and out of clamping position against the cross slide nut also engaging said screw; and Fig. 4 is a front elevation of the member for rotating the supplemental nut.

In the operation of lathes adapted to perform relieving or backing-off operations, and also for turning tapers, it is usual to reciprocate the cross slide on the tool carriage by different mechanism. When turning a taper or conical surface in a lathe, a taper bar is mounted preferably upon the rear of the lathe and the cross slide screw is bodily moved forward or back during the longitudinal or feeding movement of the carriage along the lathe bed. In relieving operations the screw controlling the position of the cross slide is reciprocated a number of times for each rotation of the work. During both of these operations it is essential to eliminate all lost motion or back-lash between the cross slide nut and the adjusting screw therefor. It is, however, essential that the means provided for clamping this slide and screw should be conveniently operated and permit prompt releasing of the clamping means for normal turning operations of the lathe.

Referring more in detail to the figures of the drawings, I provide a cross slide 10 shown mounted upon a carriage 11 slidable along the ways provided on the bed 12 of a lathe or other machine. As the invention relates entirely to the cross slide 10 and its adjusting and operating means, a complete showing of the lathe bed and tool carriage are not thought to be necessary. The carriage 11 for the cross slide 10 is shown provided with a screw 13, the rear end of which is rotatably mounted as by means of a suitable anti-friction bearing 14 within a member 15 mounted upon the rear of the carriage 11. An extended forward portion 16 of this screw 13 is provided with suitable splines by means of which it may be turned by suitable manual connections or power driven connections which form no part of the present invention and are therefore not more fully shown.

Mounted on the cross slide 10 also is a supplemental slide or compound rest 17 within which is mounted a tool post or holder 18 for a lathe tool 19 as shown. This supplemental slide 17 is adjustable toward and from the axis of rotation of the work pieces by means of a suitable manually operated screw 20.

The member 15 supporting the screw 13 is slidable within a member 21 secured in fixed position to the rear of the carriage 11 and may be clamped in adjusted positions thereto by a wedge 22. A screw 23 having a conical end is provided for clamping and unclamping the wedge 22. When clamped the lathe is adapted for straight turning operations but when unclamped tapers may be turned and relieving operations performed.

Mounted on the rear surface of the bed or base of the machine is a bracket 24 having mounted thereon an angularly adjustable bar 25 or member having a recess 26. The obliquity of this bar 25 relative to the ways of bed 12 may be varied in the usual manner so that as the carriage traverses the bed a member 27 depending from the carriage 11 and fitting within the recess 26 may be moved forward and back to vary the position of the tool 18 relative to the axis of the work. Also a relieving cam 28 may be mounted within a housing upon the rear of the carriage 11 so that by rotation of this cam and appropriate mechanism shown fragmentarily only in Fig. 1 the screw 13 may be bodily reciprocated and thus will reciprocate the cross slide 10. This mechanism is or may be of any usual or standard form and enables tapers of different form and relieving operations to be performed in the usual manner.

In order to clamp the cross slide 10 upon its adjusting screw 13 during relieving operations a supplemental or rotatable nut 30 is mounted on the screw 13 adjacent the nut 31 secured to and depending from the lower surface of the cross slide 10. Unless this supplemental nut 30 is clamped rigidly against the face of the fixed nut 31, the screw 13 may readily be rotated within its bearings as shown, which in turn will correspondingly adjust the transverse position of the cross slide. If, however, the supplemental nut 30 is rotated to strongly bear against the end face of fixed screw 31, the screw 13 and cross slide 10 will be effectively locked together and any movement of the cross slide 10 must be effected by axial movement of the screw 13 within the carriage 11.

In order to effect this locking and unlocking of the supplemental nut 30 against the nut 31, a member 32 is slidably mounted transversely of the cross slide 10, which is provided with a number of rack teeth engaging gear teeth on the periphery of the supplemental nut 30. Sliding movement of this member 32 shown in detail in Fig. 4 rotates the nut 30 upon its screw 13 and into or out of contact with the face of the fixed nut 31 and thus locks or unlocks it relative to the fixed nut 31. At one end of the member 32 shown in Fig. 4 are rack teeth, these teeth being in engagement with a small pinion 33 upon the rear end of a forwardly extending shaft 34. This shaft is mounted within suitable bearings within the cross slide 11 and extends beyond the forward wall of this cross slide. Upon the forward end of the shaft 34 is mounted a hand lever 35 for conveniently rotating the shaft 34 to slidably move the member 34 and thus rotate the supplemental nut.

What I claim is:

1. A cross slide operating mechanism for lathes comprising in combination, a lathe carriage, a cross slide movable thereon, a screw mounted in said carriage, a nut mounted in said slide and engaging said screw, means to rotate said screw, means to axially reciprocate said screw, a supplementary nut on said screw adjacent said first mentioned screw, and means operable from the front of said cross slide to rotate said supplementary nut into and out of contact with said first mentioned nut.

2. A cross slide operating mechanism for lathes comprising in combination, a lathe carriage, a cross slide movable thereon, a screw mounted in said carriage, a nut mounted in said slide and engaging said screw, manual means to rotate said screw, means to axially reciprocate said screw, a supplementary nut on said screw adjacent said first mentioned screw, gear teeth on said supplemental nut, a member slidably mounted within said cross slide and engaging said gear teeth, and means operable from the front of said cross slide to move said member and rotate said nut into and out of clamping position relative to said first mentioned nut.

3. A cross slide operating mechanism for lathes comprising in combination, a lathe carriage, a cross slide movable thereon, a screw mounted in said carriage, a nut in said slide engaging said screw, manual means to rotate said screw, means to axially reciprocate said screw, a supplementary nut on said screw adjacent said first mentioned screw, a transversely movable member mounted in said cross slide and engaging said nut, and means operable from the front of said cross slide to move said member and rotate said nut into and out of clamping position against said fixed nut.

4. A cross slide operating mechanism for lathes comprising in combination, a lathe carriage, a cross slide movable thereon, a screw mounted in said carriage, a nut in said slide engaging said screw, manual means to rotate said screw, means to axially reciprocate said screw, a supplementary nut on said screw adjacent said first mentioned screw, a shaft extending to the forward end of said cross slide having a lever thereon, and means to rotate said nut into and out of clamping position against said fixed nut.

5. A cross slide operating mechanism for lathes comprising in combination, a lathe carriage, a cross slide movable thereon, a screw mounted in said carriage, a nut in said slide engaging said screw, manual means to rotate said screw, means to axially reciprocate said screw, a supplementary nut on said screw adjacent said first mentioned screw, and a lever at the front of said cross slide to rotate said nut into and out of clamping position relative to said fixed nut.

6. A cross slide operating mechanism for lathes comprising in combination, a lathe carriage, a cross slide movable thereon, a screw mounted in said carriage, a nut in said slide engaging said screw, manual means to rotate said screw, means to axially reciprocate said screw, a supplementary nut on said screw adjacent said first mentioned screw, a shaft extending to the front of said cross slide and having a hand lever thereon, and means connecting said shaft and supplemental nut, whereby oscillation of said shaft by said lever will rotate said supplemental nut into and out of clamping position relative to said first mentioned nut.

ALEXANDER G. WHITEHEAD.